(12) United States Patent
English

(10) Patent No.: US 6,366,533 B1
(45) Date of Patent: Apr. 2, 2002

(54) UNDERWATER RECONNAISSANCE AND SURVEILLANCE SYSTEM

(75) Inventor: Thomas P. English, Panama City, FL (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/620,323

(22) Filed: Jul. 17, 2000

(51) Int. Cl.$^7$ ................................................ H04B 11/00
(52) U.S. Cl. ...................................................... 367/131
(58) Field of Search ................................. 367/131, 133, 367/134, 7; 114/312, 322, 328, 330, 331; 250/330

(56) References Cited

U.S. PATENT DOCUMENTS

| | | | | |
|---|---|---|---|---|
| 4,010,619 A | * | 3/1977 | Hightower et al. | 114/322 |
| 4,686,927 A | * | 8/1987 | Hawkes et al. | 114/331 |
| H1645 H | * | 5/1997 | Lewis | 250/330 |

* cited by examiner

*Primary Examiner*—Daniel T. Pihulic
(74) *Attorney, Agent, or Firm*—Harvey A. Gilbert; Donald G. Peck

(57) ABSTRACT

A reconnaissance/surveillance system for remote viewing of a selected location while providing a standoff distance from the selected location for personnel controlling the reconnaissance/surveillance system includes a remote controlled underwater vehicle and a delivery vehicle formed to deliver the remote controlled underwater vehicle to an underwater deployment position. An operator control console in the delivery vehicle is connected to the remote controlled underwater vehicle via a fiber optic communications link. A battery powered propulsion apparatus moves the remote controlled underwater vehicle through water to a viewing station under control of the operator control console. The remote controlled underwater vehicle includes sensing apparatus that provides signals that the operator control console uses to navigate the remote controlled underwater vehicle to the viewing station. The remote controlled underwater vehicle carries imaging apparatus arranged to form an image of an object at the selected location and transmit the image to the operator control console. The remote controlled underwater vehicle may also include a laser target designation system.

7 Claims, 5 Drawing Sheets

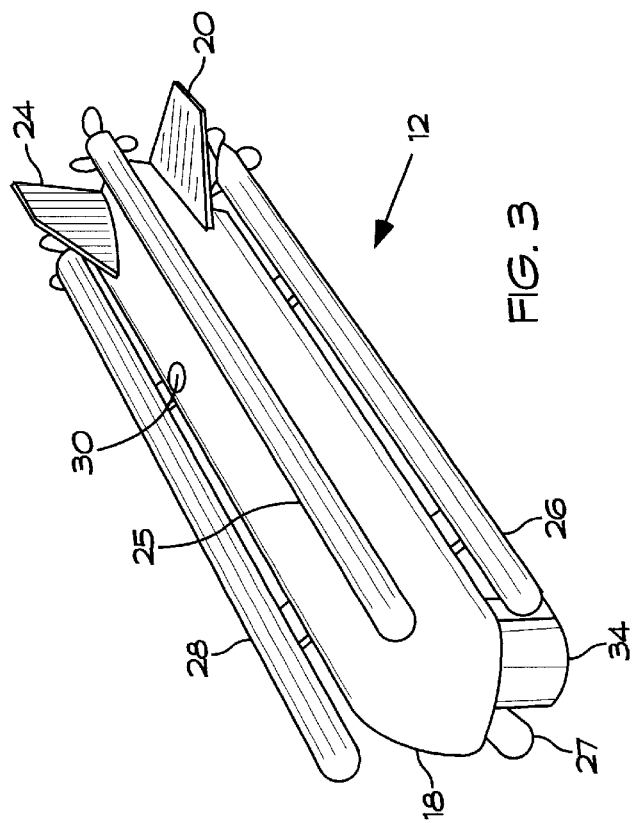
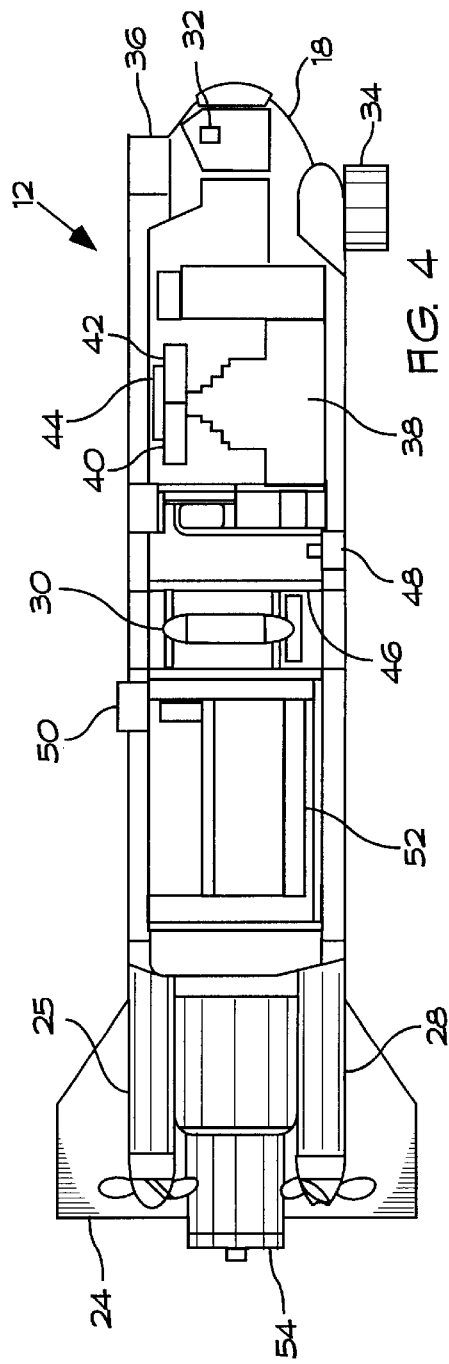

UNDERWATER RECONNAISSANCE AND SURVEILLANCE SYSTEM

BACKGROUND OF THE INVENTION

1. Field of the Invention

This invention relates generally to underwater reconnaissance and surveillance. This invention relates particularly to a system for reconnaissance and surveillance underwater obtains data on a selected location for surveillance, mapping or target designation. Still more particularly, this invention relates to a reconnaissance and surveillance system that includes remote controlled underwater vehicle that obtains data on a selected location while providing a standoff distance for personnel who are controlling the system.

2. Description of the Prior Art

There exists an underwater weapon that contains a shape charge warhead and is used in foreign mine counter measures. The warhead component is modular in design. The weapon is deployed into the water, and after the system is initiated, the weapon begins to run a predetermined course to the target. As certain distances and time requirements are met, the safe and arm mechanism within the weapon passes certain safety criteria and the weapon begins to arm. Once the weapon is within the terminal homing capability of the sonar, the weapon will automatically begin a run to the target. When it reaches the target, the weapon will detonate on contact, or it can be command detonated by the system operator.

Currently there exists no reconnaissance and surveillance capability within that allows for remote surface viewing, sub-surface viewing of potential areas of interest or laser designation of a potential target. In addition there exists no capability of mapping or imaging an area underwater at night with a non-visible light source or on-board sonar within the body of a small vehicle that is remotely operated. There is no small vehicle that incorporates a surface camera, a sub-surface camera, a laser designation capability and sonar.

SUMMARY OF THE INVENTION

The present invention provides a reconnaissance and surveillance vehicle that overcomes the deficiencies of prior devices for remote viewing of an object above or below the water surface.

A reconnaissance and surveillance vehicle according to the invention is capable of performing both surface and sub-surface missions. When deployed from a sealed delivery system, the reconnaissance and surveillance vehicle is capable of travelling several nautical miles under water. For the surface mission, when the reconnaissance and surveillance vehicle reaches a position of interest, the vehicle hovers several inches beneath the surface. At that time the vehicle deploys a telescoping camera above the surface to transmit live real time images of the area of interest back to the sealed delivery system or for laser designation of potential targets.

For the sub-surface mission, when the reconnaissance and surveillance vehicle reaches a position of interest, the underwater camera and light on board the vehicle will be activated. This allows the crew of the sealed delivery system to inspect underwater areas of interest or map and/or image an area underwater at night. Using a non-visible light source or on-board sonar from a remote location affords the crew a standoff capability currently not available.

An object of the invention is to provide a reconnaissance/surveillance system for remote imaging of a selected location that is either above or below the water surface while providing a standoff distance from the selected location for personnel controlling the reconnaissance/surveillance system.

Another object of the invention is to provide a reconnaissance/surveillance system that includes a remote controlled underwater vehicle that carries a subsurface camera arranged to form images using non-visible light.

A further object of the invention to provide a battery powered propulsion system for the remote controlled underwater vehicle.

Still another object of the invention is to provide a reconnaissance/surveillance system that includes a remote controlled underwater vehicle having an imaging system that comprises a telescoping mast arranged to extend above the water surface and a surface camera mounted to an upper portion of the telescoping mast.

An object of the invention is to provide a reconnaissance/surveillance system that includes a remote controlled underwater vehicle comprising a laser target designation module mounted to the mast and arranged to designate the selected location as a target.

A further object of the invention is to provide a reconnaissance/surveillance system that includes a fiber optical communications link between an unmanned remote controlled underwater vehicle and an operator control console mounted in a manned delivery vehicle arranged to deploy the unmanned remote controlled underwater vehicle toward a selected target.

An object of the invention is to provide a reconnaissance/surveillance system that comprises a remote controlled underwater vehicle having a telescoping mast arranged to extend above the water surface and a global positioning system module mounted to the telescoping mast, the global positioning system module being arranged to provide position data for the remote underwater vehicle to the operator control console via the fiber optic communications link.

An appreciation of the objectives of the present invention and a more complete understanding of its structure and method of operation may be had by studying the following description of the preferred embodiment and by referring to the accompanying drawings.

BRIEF DESCRIPTION OF THE DRAWINGS

FIG. 3 is a perspective view of the reconnaissance and surveillance vehicle of FIG. 1;

FIG. 4 is a cross sectional view showing the internal features of a reconnaissance and surveillance vehicle according to the present invention;

DETAILED DESCRIPTION OF THE INVENTION

Figure 1:
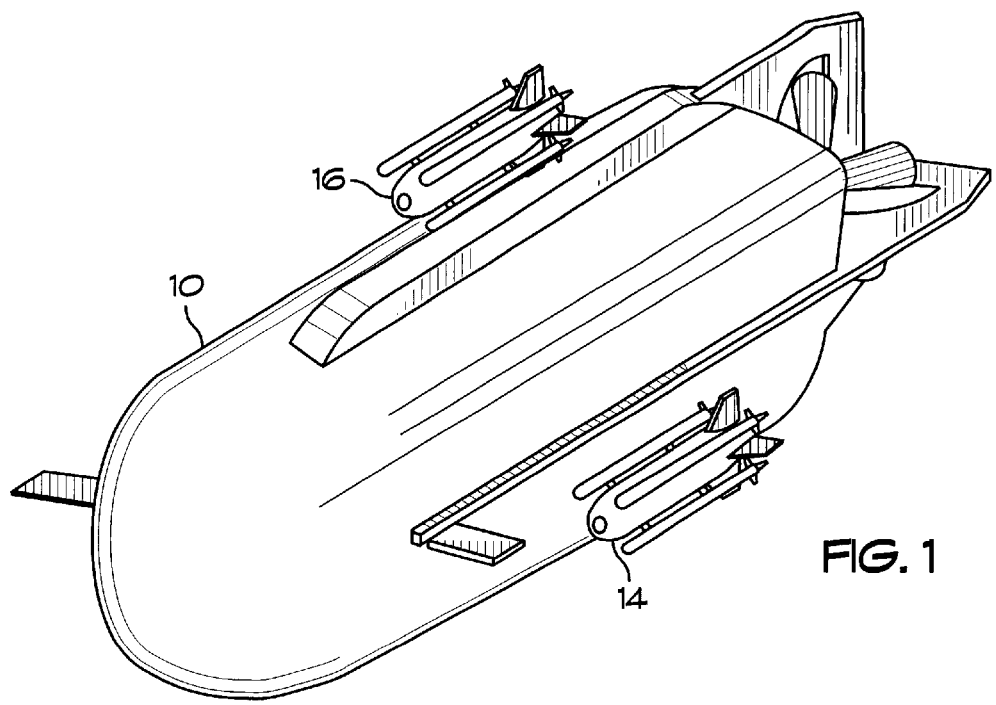
FIG. 1 is a front perspective view of a sealed delivery vehicle with side and top mounted reconnaissance and surveillance vehicles according to the present invention.
Figure 2:
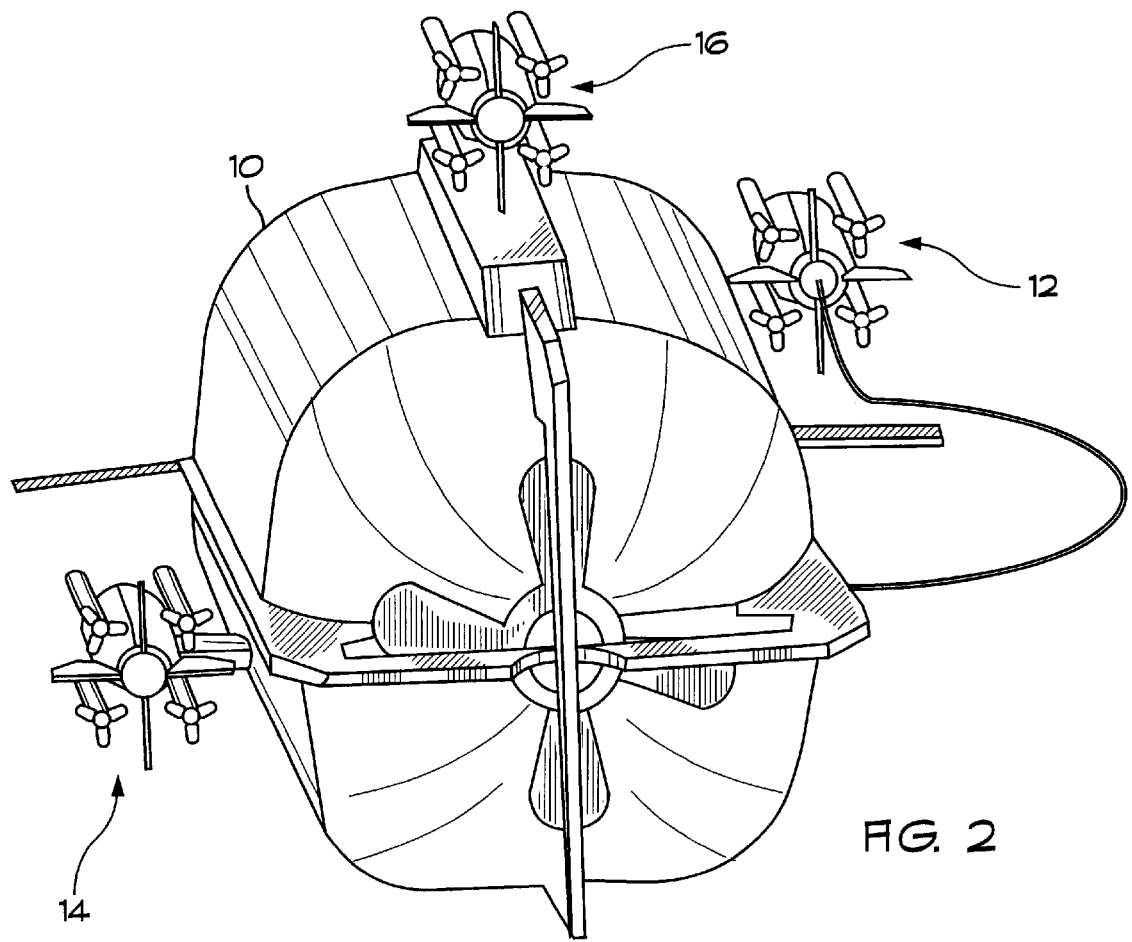
FIG. 2 is a rear perspective view of the delivery vehicle and reconnaissance and surveillance vehicles of FIG. 1.

FIGS. 1 and 2 are perspective views showing a sealed delivery vehicle (SDV) 10 arranged to carry side-mounted reconnaissance and surveillance vehicles 12 and 14 according to the present invention. The SDV 10 may also carry a top-mounted reconnaissance and surveillance vehicle 16. The SDV 10 is an operator-controlled submarine. The reconnaissance and surveillance vehicles 12, 14 and 16 are underwater vehicles that are controllable by the operator of the SDV 10.

FIG. 2 is an enlarged perspective view showing the reconnaissance and surveillance vehicle 12 in greater detail than is shown in FIG. 1. The reconnaissance and surveillance vehicles 12, 14 and 16 preferably are identical in structure. Therefore, only the reconnaissance and surveillance vehicle 12 is described in detail. The reconnaissance and surveillance vehicle 12 has an elongate water-tight hull 18 having a length of about 39 in. (1.3 m). The reconnaissance and surveillance vehicle 12 weighs about 88 lbs. (40 kg).

FIG. 3 is a perspective view of the reconnaissance and surveillance vehicle 12 of FIGS. 1 and 2. A pair of horizontal stabilizers 20 and 22 and a vertical stabilizer 24 are mounted in aft portions of the hull 18. The reconnaissance and surveillance vehicle 12 preferably includes four horizontal propulsion motors 25–28 mounted 90° apart around the circumference of the hull 18. The horizontal propulsion motors 25–28 are preferably battery powered to provide thrust along the longitudinal axis of the hull 18. The four horizontal propulsion motors 25–28 preferably are mounted symmetrically about the hull 18 and provide a range of about 547 yd. (500 m) and a speed of about 6 knots. A vertical tunnel thruster 30 that is also preferably battery powered provides thrust necessary for controlling the depth of the reconnaissance and surveillance vehicle 12 in the water.

FIG. 4 is shows internal features of the reconnaissance and surveillance vehicle 12. A compass module 32 is mounted in the forward portion of the hull 18. The compass module 32 contains a guidance and control package. A sonar head 34 is mounted below the compass module 32. The sonar head 34 has a range of about 100 m. An underwater camera/headlight module 36 is mounted in the forward portion of the hull above the compass module 32.

Proceeding aft from the compass module 32 mounted in the hull 18 is an intelligence package 38 that contains a periscoping IR remote viewing camera 40 and a laser designator module 42. The intelligence package 38 may also include a global positioning system (GPS) module 44.

The vertical tunnel thruster 30 is located near the center of the hull 18. The vertical tunnel thruster 30 is mounted in a shaft 46 and provides a hovering capability.

An echo sounder 48 may be mounted adjacent the vertical tunnel thruster 30. A transponder/responder 50 and an electronics cage 52 are located aft the thruster 30. The last section of the reconnaissance and surveillance vehicle 12 houses a fiber optic spool assembly 54. The fiber optic spool assembly 54 includes a fiber optic cable 56, shown in FIG. 4, that is connected between the reconnaissance and surveillance vehicle 12 and the SDV 10. The fiber optic cable 56 preferably has a length of about 2187 yd. (2000 m).

Figure 5:
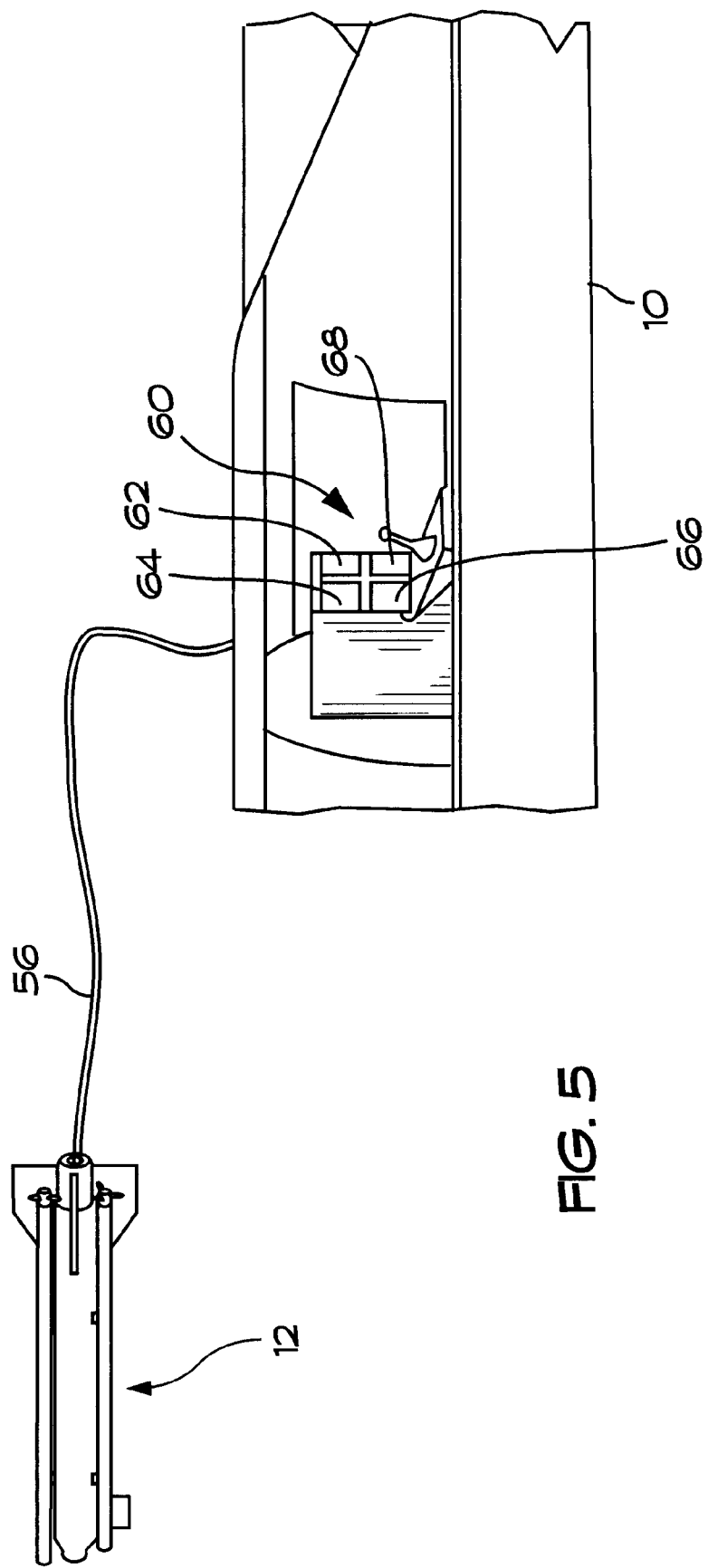
FIG. 5 shows a reconnaissance and surveillance vehicle control console that may be included in the delivery vehicle of FIGS. 1 and 2 and showing a deployed reconnaissance and surveillance vehicle connected to the delivery vehicle via a cable.
Figure 6:
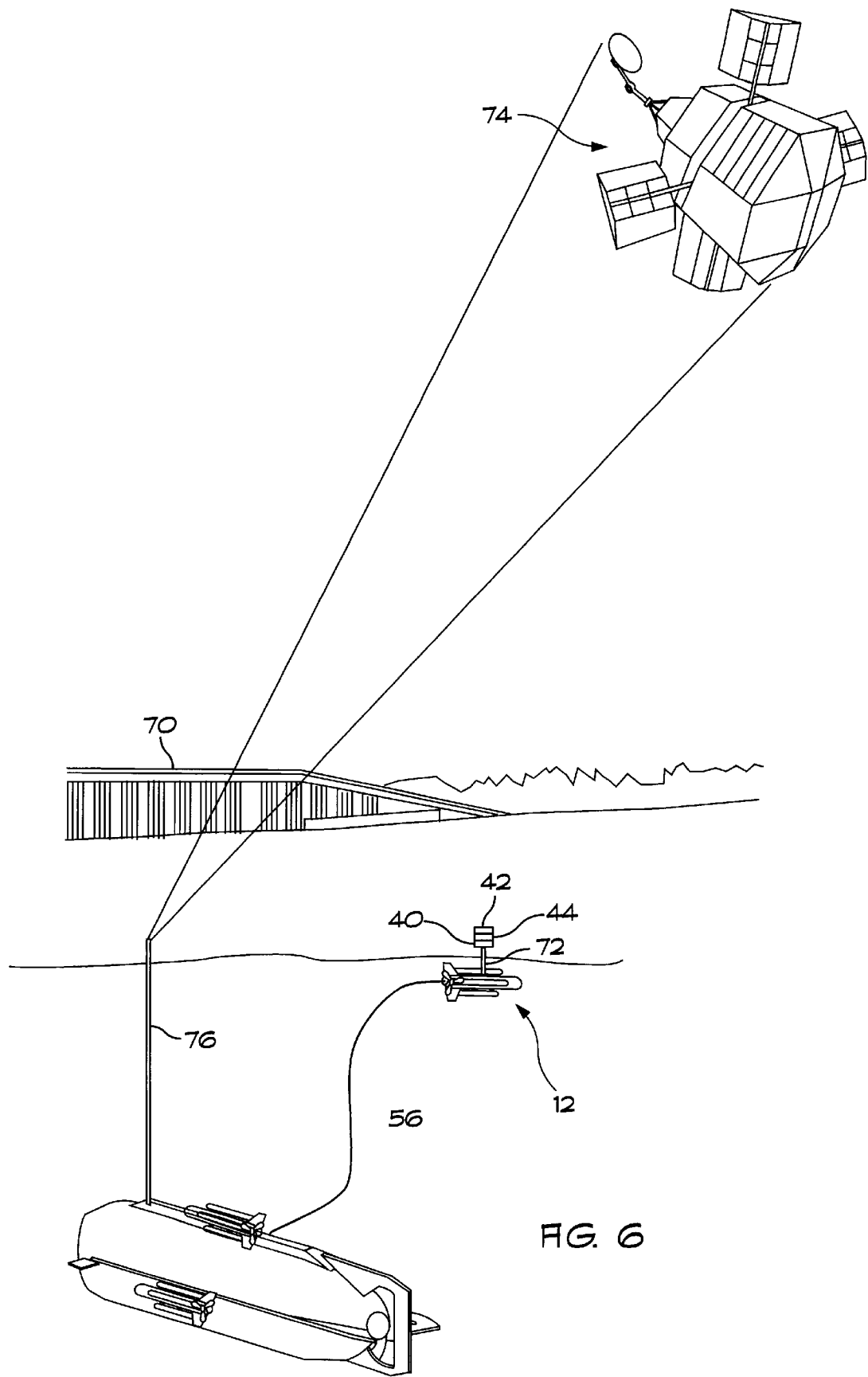
FIG. 6 shows the deployed reconnaissance and surveillance vehicle approaching a target and transmitting information to a communications satellite.

FIGS. 2, 5 and 6 illustrate the reconnaissance and surveillance vehicle 12 after it has been deployed from the SDV 10. The fiber optic cable 56 is used to transmit control signals and information between the SDV 10 and the reconnaissance and surveillance vehicle 12. FIG. 5 shows part of the SDV 10 cut away to show an onboard operator control console (OCC) 60 that is used to control the reconnaissance and surveillance vehicle 12. The compass module 32, the sonar head 34, the underwater camera/headlight module 36, the intelligence package 38, the periscoping IR remote viewing camera 40, the laser designator module 42, the GPS module 44, the echo sounder 48, the vertical tunnel thruster 30, the transponder/responder 50, the electronics cage 52 and the fiber optic spool assembly 54 are all connected to the OCC 60 using techniques well-known in the art. The fiber optic cable 56 transmits data and control signals between the OCC 60 and the reconnaissance and surveillance vehicle 12. The OCC 60 includes a video display 62 that the operator may view to see the environment of the reconnaissance and surveillance vehicle 12.

The OCC 60 further includes a tactical display 64, a touch screen 66 and a sonar display 68. The tactical display 64 provides the operator with data on the scenario, position of the reconnaissance and surveillance vehicle 12, attitude, status, target or desired GPS location, sonar search sector, and environmental data. The touch screen 66 allows the operator to control all phases of the mission selected for the reconnaissance and surveillance vehicle 12. The sonar display 68 is an active search format. The sector azimuth can be selected during vehicle run out and progressively narrowed as the reconnaissance and surveillance vehicle 12 approaches the intended area.

Figure 7:
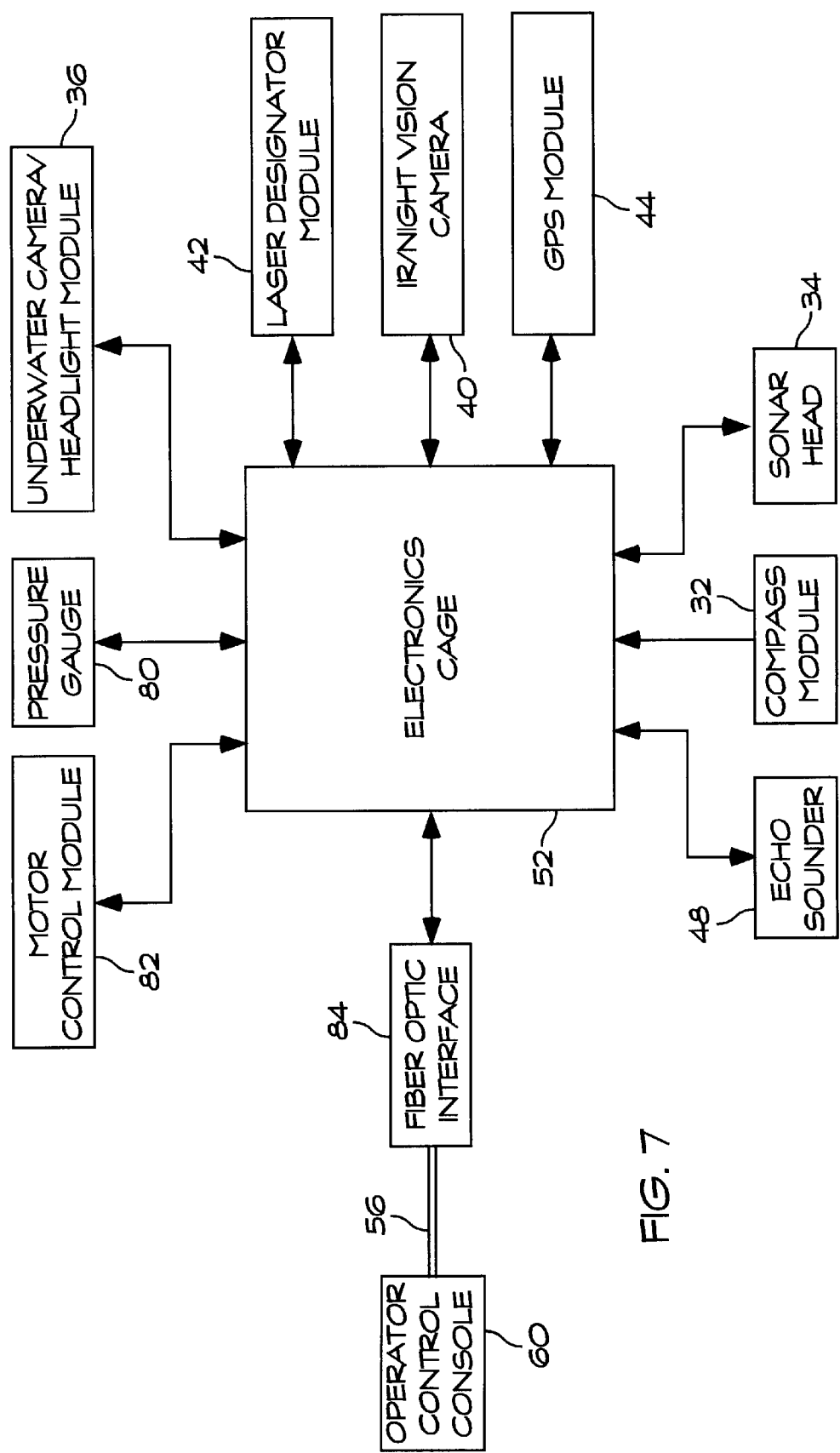
FIG. 7 is a block diagram of sensor and control systems that may be included in the reconnaissance and surveillance vehicle according to the present invention.

FIG. 7 is a generalized block diagram of the sensing and control systems included in the present invention. The compass module 32, the echo sounder 48 and a pressure gauge 80 provide environmental data to the electronics cage 52. The sonar head 34, the underwater camera/headlight module 36, the periscoping IR remote viewing camera 40, the laser designator module 42, the GPS module 44 and a motor controller module 82 are interfaced with the electronics cage 52. A fiber optic interface module 84 is connected between the electronics cage 52 and the OCC 60. The fiber optic interface module 84 includes well-known components such as phase modulators (not shown) to convert data from the electronics cage 52 into a form that can be carried by an optical carrier signal guided by the fiber optic cable 56. The fiber optic interface 84 also includes apparatus such as demodulators (not shown) for converting optical signals input to the fiber optic cable by the OCC 60 into electrical control signals that can be sent to the various components of the reconnaissance and surveillance vehicle 12.

Performance of a mission involves deploying the reconnaissance and surveillance vehicle 12 from the SDV. Once the reconnaissance and surveillance vehicle 12 is deployed from the SDV 10, the OCC 60 takes control of the reconnaissance and surveillance vehicle 12 for the duration of the selected mission. Immediately after deployment of the reconnaissance and surveillance vehicle 12, the operator takes control of it and begins the process of transiting the reconnaissance and surveillance vehicle 12 to a selected location.

FIG. 6 shows the SDV 10 and reconnaissance and surveillance vehicle 12 in the vicinity of a bridge 70 that represents a typical target. The GPS module 44 is mounted on top of the periscoping IR remote viewing camera 40 and is used to guide the reconnaissance and surveillance vehicle 12 to the selected location. While traversing to the target/area of interest the operator typically brings the reconnaissance and surveillance 12 vehicle within one half-meter of the water surface. The operator then extends the periscoping IR remote viewing camera 40 so that it just breaks the surface. The GPS location is then established.

Establishing the position of the reconnaissance and surveillance vehicle using the GPS module 44 may be done several times on the way to the target/area of interest to provide an accurate tracking capability. Once the reconnaissance and surveillance vehicle 12 is at the desired location, it remains approximately a half meter beneath the surface of the water. The vertical thruster 30 maintains the reconnaissance and surveillance vehicle 12 at the desired depth in the water to keep the reconnaissance and surveillance vehicle 12 at the selected station. As shown in FIG. 6, the periscoping IR remote viewing camera 40 camera mounted on top of a telescoping mast 72 is then deployed and activated by the operator in the SDV 10 to survey the area of interest.

The reconnaissance and surveillance vehicle 12 may also be used for laser target designation. Once the reconnaissance and surveillance vehicle 12 is on station and the operator in the SDV 10 has acquired the target of interest, the laser designator system 48 is activated. The reconnaissance and surveillance vehicle 12 transmits data on the target position back to the SDV 10 via the fiber optic cable 56. The SDV 10 then sends the target position data to a satellite 74 via a telescoping antenna 76 that extends upward from the SDV 10. The target data is then acquired by a communications center (not shown) that then directs an aircraft or a missile, for example, toward the target 70. The target is illuminated with a laser beam from the laser designator module 42 until ordnance is delivered to the target. In order to maintain the illumination of the target 70 in a stable manner, the laser designator system preferably is stabilized.

The reconnaissance and surveillance vehicle 12 also is capable of performing under water imaging missions. For such missions the reconnaissance and surveillance vehicle 12 transits under control of the operator to the intended area of interest. Once the reconnaissance and surveillance vehicle 12 is at the desired location, the operator turns on the underwater camera/headlight module 36. The non-visible light source has a wavelength, for example, infrared, that is not within the spectrum visible to the human eye. The camera/headlight assembly module 36 has a lens/filter system that allows it to view objects of interest underwater but without being visible to someone above the surface. The on-board sonar head 34 is then used in conjunction with the camera/headlight assembly 36 for detecting obstacles or underwater threats to the SDV 10.

There currently is no underwater vehicle, the size of the reconnaissance and surveillance vehicle 12 according to the present invention that is capable of a performing these missions. No one vehicle integrates an IR/Night Vision camera onto a telescoping mast that also contains a GPS and laser designation capability.

This invention can be used by naval personnel to perform remote viewing while providing the crew of the SDV 10 a standoff distance. Drug Enforcement Agency personnel, Federal Bureau of Investigations, Alcohol Tobacco and Firearms and Central Intelligence Agency may also use this vehicle for intelligence gathering and reconnaissance activities.

What is claimed is:

1. A reconnaissance/surveillance system for remote viewing of a selected location while providing a standoff distance from the selected location for personnel controlling the reconnaissance/surveillance system, comprising:
   an underwater delivery vehicle that includes an operator control console;
   a plurality of remotely controlled underwater vehicles mounted to the underwater delivery vehicle, each of the remotely controlled underwater vehicles including:
      a propulsion system;
      a telescoping mast that operates under the control of the operator control console;
      a global positioning system module mounted to the telescoping mast for providing position data to the operator control console;
      a camera mounted to the mast for forming an image of the selected location; and
      a laser target designation module mounted to the telescoping mast and arranged to designate the selected location as a target;
   a communications link connected between the operator control console and the remote controlled underwater vehicles, the operator control console being arranged to provide control signals via the communications link for deploying a selected one of the remotely controlled underwater vehicles from the delivery vehicle and controlling its propulsion system to transit it to a viewing station for performing a selected mission.

2. The reconnaissance/surveillance system of claim 1, wherein each of the remotely controlled underwater vehicles further comprises:
   a sonar module arranged to provide sonar images from the remotely controlled underwater vehicle to the operator control console;
   a non-visible light source;
   an underwater camera arranged to form images of object illuminated by the non-visible light source.

3. A reconnaissance/surveillance system for remote viewing of a selected location while providing a standoff distance from the selected location for personnel controlling the reconnaissance/surveillance system, comprising:
   a remote controlled underwater vehicle;
   a delivery vehicle formed to deliver the remote controlled underwater vehicle to an underwater deployment position;
   an operator control console in the delivery vehicle connected to the remote controlled underwater vehicle via a communications link;
   propulsion apparatus for moving the remote controlled underwater vehicle through water to a viewing station under control of the operator control console; and
   an imaging system mounted in the remote controlled underwater vehicle and arranged to form an image of an object at the selected location, the imaging system comprising a subsurface camera arranged to form images using non-visible light, a telescoping mast arranged to extend above the water surface and a surface camera mounted to an upper portion of the telescoping mast.

4. The reconnaissance/surveillance system of claim 3 further comprising a laser target designation module mounted to the mast and arranged to designate the selected location as a target.

5. The reconnaissance/surveillance system of 3 wherein the communications link comprises a fiber optic cable arranged to transmit control signals and data between the operator control console and the remote controlled underwater vehicle.

6. The reconnaissance/surveillance system of claim 5 further comprising a global positioning system module mounted to the telescoping mast, the global positioning system module being arranged to provide position data for the remote underwater vehicle to the operator control console while the remote controlled underwater vehicle is in transit from the delivery vehicle to the viewing station.

7. The reconnaissance/surveillance system of claim 3 wherein the propulsion apparatus comprises a battery-powered horizontal motor for moving the remote controlled underwater vehicle through water to the viewing station and a vertical thruster for controlling the depth of the remote controlled underwater vehicle.

* * * * *